July 1, 1969 K. HURST ET AL 3,453,649

THERMAL RECORDER

Filed Oct. 18, 1967

INVENTORS
Kurt HURST
Alfred ORTLIEB
By
Michael S. Striker
their ATTORNEY

United States Patent Office 3,453,649

Patented July 1, 1969

3,453,649

THERMAL RECORDER

Kurt Hurst, Stuttgart-Feuerbach, and Alfred Ortlieb, Stuttgart-Vaihingen, Germany, assignors to Robert Bosch G.m.b.H., Stuttgart, Germany Filed Oct. 18, 1967, Ser. No. 676,358
Claims priority, application Germany, Oct. 21, 1966, B 89,496
Int. Cl. G01d 15/10
U.S. Cl. 346—76 14 Claims

ABSTRACT OF THE DISCLOSURE

An elongated record carrier provided with a metallic coating is moved in a predetermined direction. An electrode has a front edge which engages this coating, and the electrode is selectively energizable for directing an electric current through the coating so as to burn away localized portions of the coating. The electrode has a front face which extends rearwardly away from the front edge which is inclined oppositely to the direction of movement of the record carrier.

*Background of the invention*

The invention generally relates to recording devices, and more particularly to the type of recording devices wherein markings are produced on a record carrier by contacting the latter with an electrode and selectively passing a current from the electrode through the record carrier to thereby burn away localized portions of the record carrier surface.

It is known to provide record carriers which are coated with a metallic layer which can be selectively burned away in localized areas as a result of passage of current through the layer and the carrier. The carrier itself is usually of a color different from that of the metallic layer so that, when portions of the latter are burned away, the color of the underlying carrier base material will become clearly visible. The frequency, spacing, grouping, etc., of these exposed portions then convey information in a manner which need not be further described because it is well known in the art.

In recording devices which utilize such record carrier the carrier is generally moved in only one direction, and the electrode is usually stationary. As the tip of the electrode glides over the record carrier surface, the material of the coating layer is burned away in the area of contact with the tip whenever the electrode is energized. However, the burning process is not total and particles of residue usually remain behind. Additionally, metallic particles dislodged by the contact of the electrode tip with the layer of metallic coating, become admixed with the residue and together with the same they form at the electrode tip a so-called "oxide beard" which is electrically conductive. This frequently leads to a broadening of the burned-out area because, if the oxide beard extends laterally beyond the tip of the electrode, the area of contact with the record carrier surface and the area over which current is conducted through the record carrier is of course accordingly enlarged. In arrangements where two or more electrodes are arranged side by side with small spacing from one another the development of such an oxide beard can result in short-circuiting of the adjacent electrodes.

This is evidently all undesirable, and efforts have therefore been made to overcome the formation of oxide beard. These efforts have been directed towards various different approaches. For instance, a mechanical stripper in form of a brush or the like has been provided, over which the tip of the electrode is caused to pass with the intention of thereby removing the residue from the electrode tip. This is a construction which is relatively complicated and therefore expensive, as is another suggestion according to which a gas such as compressed air is to be directed against the electrode tip. Another proposal envisions resilient mounting of the electrode in such a manner that the latter undergoes small deflections in opposition to its resilient mounting whose restoring force is intended to fling the residue off the electrode tip. However, it has been found that this is not sufficient to properly remove the residue and, furthermore, the lack of available space makes it impossible to utilize this arrangement in circumstances where two or more electrodes are arranged closely adjacent to one another. Finally, it is also known to coat the metallic coating itself with a layer of oil or vaseline in the hope that the residual particles will be retained in this layer and thus prevented from adhering to the electrode tip. While this arrangement is basically operative, it is unfortunately not suited for applications where the device must operate at relatively great speed because the presence of the oil or vaseline unduly reduces the time required for burning off portions of the metallic coating.

*Summary of the invention*

The present invention overcomes the disadvantages set forth above.

More particularly, the present invention provides a recording device of the type described earlier wherein the formation of an oxide beard consisting of particular residue is prevented or at least reduced to an acceptable level.

The device according to the present invention is extremely simple and is not only highly reliable, but because of its small economic and technological expenditure is also inexpensive to manufacture as well as to sell.

In accordance with one feature of our invention we provide, in a recording device, a record carrier having a surface provided with a coating which is adapted to be burned away in response to localized application of electric current thereto. Such record carriers, and such coatings, are well known in the art and need not be specifically described. We further provide a selectively energizable electrode which concept in itself is also known from the art, and this electrode has a front portion which engages the coating of the record carrier.

In accordance with our invention the front portion of the electrode is provided with a front edge through which electric current is applied to the coating of the record carrier and it will be understood that either the record carrier, the electrode, or both are movable with reference to one another. The electrode has, in accordance with the present invention, a front face which extends rearwardly away from the front edge and which is inclined oppositely the predetermined direction of movement of the record carrier and electrode with reference to one another. Thus, particulate residue which tends to accumulate at the front edge of the electrode during operation of the device, that is when the front edge of the electrode is energized during its sliding engagement with the coating on the record carrier, is lifted off the surface of the record carrier by the front edge and is deflected away by the inclined front face.

This is, in effect, the action of a chisel and the electrode according to the present invention in fact also has a rear face which is beveled in the manner of a chisel. The efficiency of deflection depends upon the degree of inclination of the beveled gear face with reference to the surface of the record carrier, as well as upon the angle which is defined between the front face and the beveled rear face of the electrode. The greater these factors are, the better the deflection will be. However, we have found that it is very satisfactory—and yet permits a reduction in the wear of the electrode and the avoidance of undesirably large contact areas between electrode and record carrier surface—if the front and rear faces define with one another an angle of between 5 and 30° and if the rear face of the electrode defines with the surface of the record carrier an angle of between 10 and 30°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Description of the preferred embodiments*

Figures 1, 2, 3, 4:
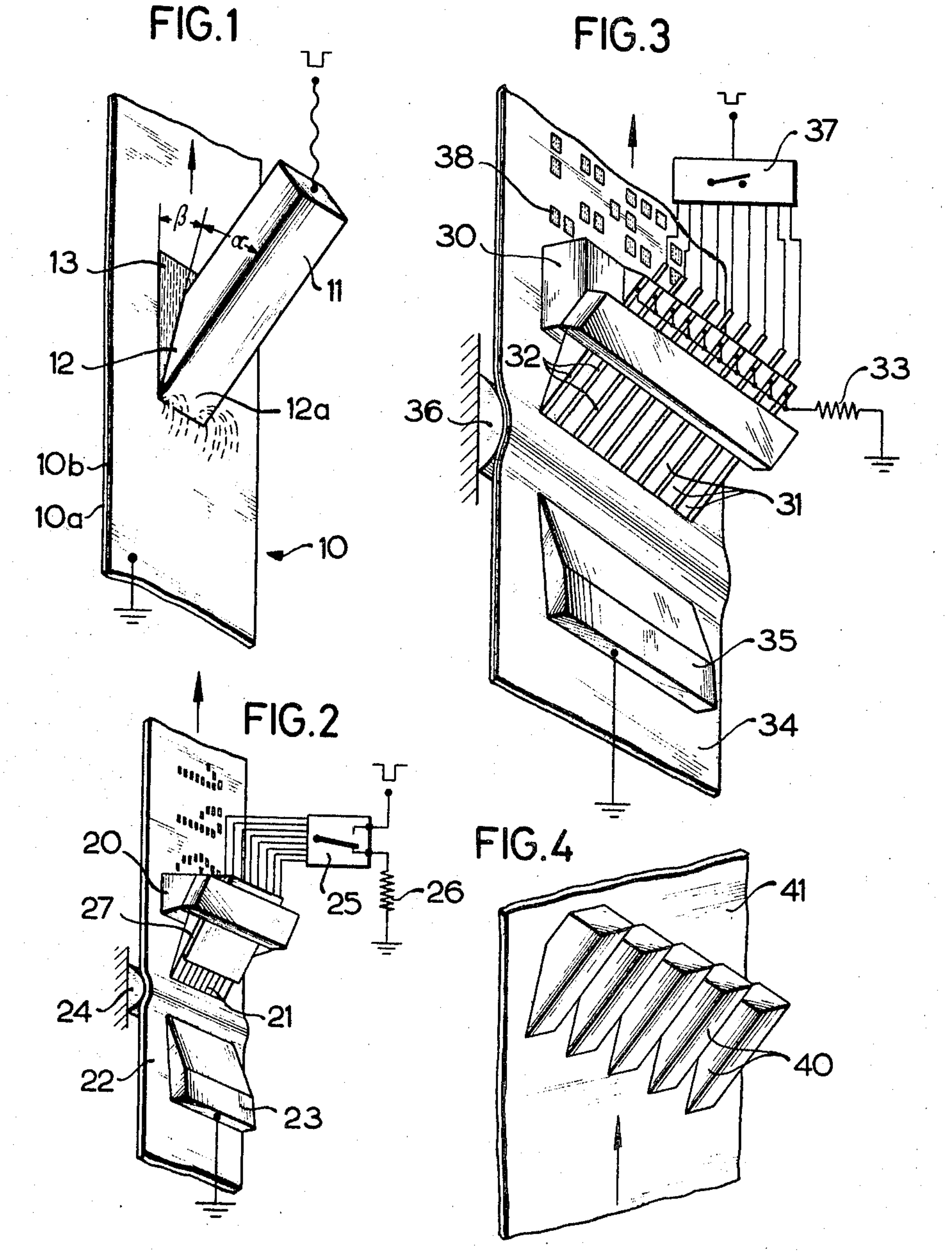
FIG. 1 is a somewhat schematic illustration of the simplest embodiment of our invention.
FIG. 2 is a view similar to FIG. 1, but illustrating an embodiment utilizing a plurality of electrodes.
FIG. 3 illustrates, also in a view somewhat similar to that of FIG. 1, a further embodiment of the invention.
FIG. 4 is a fragmentary diagrammatic view illustrating yet an additional embodiment of the invention.

Discussing now the drawing in detail, and firstly FIG. 1 thereof, it will be seen that reference numeral 10 generally identifies the record carrier which here is illustrated as a strip or tape consisting of a base 10*a* of insulating material which carries a layer 10*b* of metallic material which can be burned away as current is passed therethrough. The layer 10*b* may be vapor deposited or applied in another suitable manner and may have a thicnkess of approximately 0.1$\mu$; it is connected with mass. The writing electrode, that is the electrode stylus, is identified with reference numeral 11 and it engages the surface of the layer 10*b* as illustrated in FIG. 1.

At its front end the electrode 11 has a substantially chisel-shaped tip whose front edge contacts the layer 10*b* in sliding engagement therewith. The front face 12*a* of the electrode 11 is inclined rearwardly away from the front edge and oppositely to the direction of movement of the record carrier 10, which movement is identified with the arrow associated with the carrier. The rear face 12 of the electrode 11 is beveled in the manner of a chisel, that is it is also rearwardly and upwardly inclined and the rear face 12 and the front face 12*a* together define an angle $\alpha$ which may range between 5 and 30° and which in the illustrated embodiment is assumed to be 20°. The rear face 12 further defines with the surface of the record carrier 10 an angle $\beta$ which may range between 10 and 30° and which in the present illustrated embodiment is assumed to be 15°.

An operation of the device illustrated in FIG. 1, a negative potential of approximately 40 volts is applied to the electrode 11 relative to the layer 10*b*, and this is conventional and therefore well known in the art. As a result of this application of current a portion of the layer 10*b* whose width corresponds to the width of the front edge of the electrode 11 is burned away or vaporized. Inasmuch as the carrier 10 moves in the direction indicated by the arrow this portion becomes strip-shaped as snown in FIG. 1 and the length of the strip depends upon the period of time for which the electrode 11 is energized. This strip-shaped portion is identified with reference numeral 13 and in the embodiment of FIG. 1 it is assumed that the carrier 10 moves continuously in substantially vertical direction and upwardly as seen with becomes visible where the layer 10*b* has been burned away. In accordance with the invention the oxide beard, that is the residual particulate material resulting from incomplete combustion of the material of the layer 10*b* and from the accumulation of metal particles from the layer at the front edge of the electrode 10, is continuously scrapped off the surface of the carrier 10 and deflected away by the inclined front face 12*a* of the electrode 11. These particles fall away in downward direction, as suggested in FIG. 1.

Coming now to the embodiment illustrated in FIG. 2 it will be seen that this illustrates a recording head 20 reference to the drawing. The base layer 10*a* of course comprising a plurality of writing electrodes 21 which are arranged side-by-side, as shown in the drawing, and which are insulated from one another by thin layers of insulating material, for instance mica. The record carrier here is identified with reference numeral 22 and is assumed to consist of a layer of metalized paper which moves in the direction of the arow. The metalized layer of the record carier 22 is connected to mass via a relatively wide electrode 23 in known manner. The carrier 22 is caused to move over a support 24 by means of which sufficient pressure of the metalized layer of carrier 22 against the contact edges of the electrode 23 as well as of the writing electrodes 21 is assured. Operation of this device to the extent that it has been described thus far is the same as in FIG. 1.

In accordance with the invention as illustrated in the embodiment of FIG. 2 we further provide means for preventing the short circuiting of the adjacent writing electrodes 21. This could readily occur as residual particles become lodged between the adjacent electrodes, such residual particles of course being electrically conductive. In accordance with the invention we provide an electronic switching device 25, which need not be further described, and which is automatically operative for connecting the writing electrodes 21 with mass via a protective resistor 26 of 20 ohm resistance whenever the electrodes become deenergized. In other words, whenever the electrodes do not effect "writing" by burning away portions of the metalized layer of the carrier 22, the electrodes 21 automatically become connected to mass and,, if an electrically conductive "bridge" has formed between two adjacent electrodes as a result of deposition of electrically conductive residual particles between such electrodes, the application of a negative burning current to one of the thus connected electrodes 21 causes a current flow between the two electrodes. This current flow is so limited via the protective resistor 26 that it is capable of burning away the bridging material without, however, maintaining an arc between the two adjacent electrodes 21.

To avoid that the electrodes can be shorted by test deposition or by metallic particles of larger size, the front face of the electrodes 21 is covered by a layer of insulating material, for instance a layer 27 of mica or the like, so that only a relatively small area of the front face adjacent the front edge remains uncovered.

The embodiment of FIG. 2 illustrates a recording head for a so-called "clear-text writer," namely a device where the electrodes 21 must be so close to one another, and must be selectively energized, so as to afford traces in the record carrier which are directly readable as writing, symbols, numerals, or the like. The embodiment of FIG. 3, by contrast, illustrates an arrangement wherein the writing electrodes 31 need not be as close together as in the embodiment of FIG. 2 because the written results are to be in coded punch card-type form. Accordingly, the electrodes in the embodiment of FIG. 3, identified with reference numeral 31, are spaced from one another by a distance which is greater than 0.5 mm. The writing head shown in FIG. 3, and incorporating the electrodes 31, is generally identified with reference numeral 30 and comprises nine of the writing electrodes 31. Arranged intermediate adjacent ones of the writing electrodes 31 are respective auxiliary electrodes 32 which are smaller and of which there are ten as seen in the drawing. The auxiliary electrodes 32 are configurated in the same manner as the writing electrodes 31 from which they are insulated, for instance by mica layers. All of the auxiliary electrodes 32 are conductively connected with one another and connected to mass by means of a protective resistor 33 which here is assumed to have a value of 4 ohm.

The record carrier 34, which may be the same as the one in FIG. 2, passes beneath an electrode 35 which connects the metallic layer of the carrier 34 to mass. As in the case of FIG. 2 the carrier 34 also passes over a support 36 which causes proper engagement of the carrier 34 with the electrodes 35 as well as the electrodes 31.

As illustrated in FIG. 3, the writing electrodes 31 are so connected to a negative potential with reference to the metal layer of the record carrier 34 via an electronic switching device 37, that the burned-out portions 38 in the metal layer of the carrier 34 produce a record of information which can be coded in any desired manner. How this coding is effected, and how the device 37 operates, does not form part of the present invention. What is of importance in the embodiment of FIG. 3 is the fact that if a "bridge" of residual particles forms between an electrode 31, and an adjacent auxiliary electrode 32, thus shorting these two electrodes, this bridge is burned off by a short-circuit current which, however, is limited by the protective resistor 33 so that no arc can be maintained between these electrodes 31 and 32.

Coming, finally, to the embodiment illustrated in FIG. 4 it is to be noted that the possibility of short-circuiting "bridges" between adjacent electrodes can be reduced if the electrodes are staggered with reference to one another. This is illustrated in FIG. 4 where the carrier is identified with reference numeral 41 and is assumed to move in the direction indicated by the arrow in FIG. 4. The writing electrodes are identified with reference numeral 4 and are not only located adjacent one another with transverse spacing, but are also staggered in the longitudinal direction of the carrier 41. This staggering in the illustrated embodiment is on the order of 3 mm. Of course, the staggered arrangement is possible only in embodiments where the arrangement and positioning of the writing or recording head is such as to permit it. It will be understood that the direction of movement of the record carrier 41 can be either directly vertical in upward direction, as illustrated in FIG. 4, it can be in upward direction but at an angle to the vertical, or it can even be in substantially horizontal direction. However, it is to be remembered that in any direction of movement other than purely vertically upwardly the electrodes must be so arranged with reference to the record carrier that dislodged residual particles can fall away in downward direction because these would otherwise foul the device.

It will be understood that each of the elements described above, or two or more together, may also find a useful application in other types of recording devices differing from the types described above.

While the invention has been illustrated and described as embodied in a recording device utilizing writing electrodes and metallised record carriers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a recording device, the combination comprising record carrier means having a surface provided with a coating which is adapted to be burned away from said surface in response to localized application of electric current thereto; and selectively energizable electrode means having a front edge which engages said coating for applying electric current thereto, at least one of said means being movable in predetermined direction with reference to and in sliding engagement with the other, and said electrode means having a front face extending rearwardly away from said front edge and being inclined oppositely said predetermined direction so that particulate residue which tends to accumulate at said front edge during operation of said device is lifted off said surface by said front edge and deflected away by said inclined front face.

2. In a recording device as defined in claim 1, wherein said electrode means has a front portion provided with said front edge, said front portion being of chisel-shaped configuration.

3. In a recording device as defined in claim 1, wherein said electrode means further comprises a rear face having a bevelled rear face portion adjacent said front edge.

4. In a recording device as defined in claim 3, wherein said rear face portion is inclined with reference to said front face at an angle between 5° and 30°.

5. In a recording device as defined in claim 4, wherein said rear face portion is inclined with reference to said surface at an angle of between 10° and 30°.

6. In a recording device as defined in claim 2, said record carrier means being constructed and arranged for upward movement of said surface thereof in substantially vertical direction and with reference to said electrode means.

7. In a recording device as defined in claim 1, wherein said electrode means comprises at least two electrodes which are electrically insulated from one another; and further comprising circuit means associated with said electrodes and automatically operative in nonenergized state of said electrodes for connecting the same with mass so as to burn away particulate residue which has become lodged between said electrodes.

8. In a recording device as defined in claim 7, wherein said circuit means comprises switching means and protective resistor means.

9. In a recording device as defined in claim 1, wherein said electrode means comprises at least two electrodes which are electrically insulated from one another; and further comprising means for burning away particulate residue which has become lodged between said two electrodes, and comprising an auxiliary electrode located between and electrically insulated from said two electrodes, and circuit means including protective resistor means connecting said auxiliary electrode to mass.

10. In a recording device as defined in claim 1; and further comprising a layer of electrically insulating material provided on and covering said front face of said electrode means except for a portion thereof adjoining said front edge.

11. In a recording device as defined in claim 1, wherein said electrode means comprises at least two electrodes arranged adjacent one another transversely of said predetermined direction and staggered with reference to one another in said predetermined direction.

12. In a recording device as defined in claim 11, wherein said electrodes are staggered in said predetermined direction by 2–3 mm.

13. In a recording device as defined in claim 1, wherein said electrode means comprises at least two electrodes arranged adjacent to each other and staggered with reference to one another.

14. In a recording device as defined in claim 13, wherein said record carrier means is elongated, and wherein said electrodes are staggered in the direction of elongation of said record carrier means.

(References on following page)

References Cited

UNITED STATES PATENTS

| | | | |
|---|---|---|---|
| 912,181 | 2/1909 | Schattner | 346—76 |
| 1,825,551 | 9/1931 | Serrell | 346—1 |
| 2,040,693 | 5/1936 | Bruguenard | 274—46 |
| 2,951,738 | 9/1960 | Maneval | 346—139 |

RICHARD B. WILKINSON, *Primary Examiner.*

J. W. HARTARY, *Assistant Examiner.*

U.S. Cl. X.R.

346—139